United States Patent [19]

Abe

[11] 4,263,957
[45] Apr. 28, 1981

[54] HIGHLY DURABLE PNEUMATIC TIRES EMPLOYING CARCASS PLY CORDS WITH VARYING TWIST

[75] Inventor: Masaru Abe, Sayama, Japan

[73] Assignee: Bridgestone Tire Co., Ltd., Tokyo, Japan

[21] Appl. No.: 134,007

[22] Filed: Mar. 26, 1980

[30] Foreign Application Priority Data

Mar. 27, 1979 [JP] Japan ................................ 54-35021

[51] Int. Cl.$^3$ ...................... B60C 9/06; B60C 15/00
[52] U.S. Cl. .............................. 152/356 R; 152/359; 152/362 R; 152/354 R
[58] Field of Search ............ 152/354 R, 354 RB, 355, 152/356 R, 356 A, 357-359, 362 R

[56] References Cited

U.S. PATENT DOCUMENTS

| | | | |
|---|---|---|---|
| 2,188,174 | 1/1940 | Castricum | 152/359 |
| 2,990,870 | 7/1961 | Vittorelli | 152/356 |

OTHER PUBLICATIONS

S. K. Clark, "Mechanics of Penumatic Tires", NBS Monograph 122, (1971), pp. 172-189, 253-265.

Primary Examiner—John T. Goolkasian
Assistant Examiner—Lois E. Boland
Attorney, Agent, or Firm—Sughrue, Rothwell, Mion, Zinn and Macpeak

[57] ABSTRACT

A highly durable pneumatic tire comprising a carcass body formed by a number of laminated bias laid plies each including rubberized organic textile cords is disclosed. The carcass body is composed of at least two kinds of ply groups whose cords are the same in diameter, but different in the number of twists per unit length, the cords of the outermost ply group of the carcass having the number of twists which is 5% to 30% times larger than the number of twists of the ply group adjacent to the outermost ply group and located at the inner portion in the carcass and which is at least equal to the number of twists of the cords of the innermost ply group, and the cords of the innermost ply group of the carcass having the number of twists which is 5% to 30% times larger than the number of twists of the ply group adjacent to the innermost ply group and located at the outer portion in the carcass.

6 Claims, 11 Drawing Figures

HIGHLY DURABLE PNEUMATIC TIRES EMPLOYING CARCASS PLY CORDS WITH VARYING TWIST

BACKGROUND OF THE INVENTION

1. Field of the Invention

This invention relates to highly durable pneumatic tires used under heavy loads and more particularly to a highly durable pneumatic tire comprising a carcass body formed by a number of laminated bias laid plies each including rubberized organic textile cords.

2. Description of the Prior Art

Such kind of tires are mainly used for a truck, trailer, construction vehicle, agricultural vehicle, industrial vehicle, air plane or the like.

Such kind of tire, that is, a tire comprising a carcass body formed by a number of laminated bias laid plies each including rubberized organic textile cords, has a number of advantages, but has a few disadvantages. Among these disadvantages, the important disadvantage consists in that the number of plies of the carcass must considerably be increased in order to give the tire a strength which is required for counterbalancing the conditions subjected to the tire when it is used. This point will now be described in a more concrete manner.

In a nylon cord of 1,260 denier/2 strands (1,260 d/2), which has most popularly been used at present, for example, the number of plies of the carcass usually mounts up to 10, 20 and exceeds 40 for a tire having a large size. It is clear that the use of such large number of laminated carcass plies provides the disadvantage that production efficiency becomes bad and the manufacturing cost is increased if compared with a steel radial tire which makes use of only 1 ply for a considerably large size tire.

In order to eliminate such drawback, an easy method of decreasing the number of plies while maintaining the strength necessary for the tire has been proposed. In such method, a cord diameter is made large so as to increase the number of filaments correspondingly and hence increase the strength per one cord. For example, if use is made of a cord of 1,890 d/2 instead of the cord of 1,260 d/2, the strength of the cord is increased up to 3/2 times larger and hence the number of plies is descreased to about $\mu$ times smaller. In order to maintain a necessary space between adjacent cords, the number of cords per unit length must be decreased so that the number of plies does not become ⅔ times smaller as is expected by calculation. As a result, it is possible to reduce the number of necessary plies from 30 to the order of 22.

However, it has been found out that if the number of carcass plies is decreased according to the above mentioned method, a vital failure, that is, a cord breaking up failure is liable to be induced in the tire.

It is a matter of course that the cord breaking up failure means a tire failure in which the ply cords become cut owing to certain reasons. As a result, the cord breaking up failure seldom occurs in the tire when it is used under proper condition, but sometimes occurs when the internal pressure in the tire becomes extremely low or when the tire is subjected to overload or when the tire is subjected to sudden shocks. In addition, the cord breaking up failure is induced when the strength of the carcass of the tire becomes insufficiently small owing, for example, to the erroneous selection of the tire size to be used.

Experimental tests have shown the result that, if the carcass is the same in strength, the use of a cord having a large diameter ensures a frequent occurrence of the cord breaking up failure if compared with the use of a cord having a small diameter.

Experimental tests and investigations on the above mentioned drawback which has been encountered with the prior art techniques, that is, on a contradictory fact that the use of a cord having a large diameter for the purpose of decreasing the number of carcass plies and hence improving the productivity of the tire results in an inevitable occurrence of the cord breaking up failure, have demonstrated the result that the above mentioned drawback can effectively be eliminated by making large the number of twists of the carcass ply cords which are located at portions where the cord breaking up failure is easily induced. The invention is based on such recognition.

SUMMARY OF THE INVENTION

An object of the invention, therefore, is to provide a highly durable pneumatic tire which can decrease the number of carcass plies without inducing a cord breaking up failure, can improve the productivity of tire and hence can reduce the manufacturing cost of the tire or can improve the resistant force against the cord breaking up failure without lowering the productivity of tire.

A feature of the invention is the provision in a highly durable pneumatic tire comprising a carcass body formed by a number of laminated bias laid plies each including rubberized organic textile cords, the cords of about one half of the plies extending in an opposite direction with respect to the cords of the remaining plies and the total plies being laminated one upon the other, the improvement comprising a carcass body composed of at least two kinds of ply groups whose cords are the same in diameter, but different in the number of twists per unit length, the cords of the outermost ply group of the carcass having the number of twists which is 5% to 30% times larger than the number of twists of the ply group adjacent to the outermost ply group and located at the inner portion in the carcass and which is at least equal to the number of twists of the cords of the innermost ply group, and the cords of the innermost ply group of the carcass having the number of twists which is 5% to 30% times larger than the number of twists of the ply group adjacent to the innermost ply group and located at the outer portion in the carcass.

Further objects and features of the invention will be fully understood from the following detailed description with reference to the accompanying drawings, wherein:

DETAILED DESCRIPTION OF THE PREFERRED EMBODIMENTS

In carrying out the present invention, it is preferable to limit the construction of the carcass body as follows.

(1) The carcass body is composed of two kinds of ply groups whose cords are the same in diameter, but different in the number of twists, a ratio of the number of twists of the cord of one kind of ply group to that of the cord of another kind of ply group being 1:1.05 to 1.25, preferably 1:1.07 to 1.19.

(2) The carcass body composed of two kinds of ply groups whose cords having the above mentioned range of the ratio of the number of twists has plies laminated such that a ratio of the number of plies of the innermost ply group to the total number of plies except the number of plies of the turn-up portion of each ply at a region intermediate between the maximum width position of the tire and the bead portion is 0.06 to 0.67, preferably 0.10 to 0.50 and a ratio of the number of plies of the outermost cord ply group to the above mentioned total number of plies is 0.07 to 0.60, preferably 0.11 to 0.55.

(3) The carcass body is composed of three kinds of cord ply groups whose cords are the same in diameter, but different in the number of twists, a ratio of the number of twists between the cords of those three kinds of cord ply groups is 1:1.05 to 1.20:1.10 to 1.30, preferably 1:1.07 to 1.16:1.15 to 1.26.

(4) The plies of the carcass body composed of three kinds of ply groups whose cords are the same in diameter and have the above mentioned range of the ratio of the number of twists are laminated such that, in the range intermediate between the maximum width position of the tire and the bead portion thereof, a ratio of the number of plies of the innermost cord ply group to the total number of plies except the number of plies of the turn-up portions of each ply is 0.06 to 0.67, preferably 0.10 to 0.50 and that a ratio of the number of plies of the outermost cord ply group to the above mentioned total number of plies is 0.07 to 0.60, preferably 0.11 to 0.55.

(5) The boundary surface between adjacent cord ply groups which are different in the number of twists is interposed between inner plies of a ply bundle wound around the same bead core in the same direction or interposed between inner plies of the above mentioned ply bundle and/or between inner plies of a ply bundle wound around a bead core adjacent to the above mentioned bead core in the same direction.

In general, an organic textile cord is composed of filaments which are the same in diameter, and as a result, the total number of filaments of a large denier cord having a large outer diameter is larger than that of a small denier cord having a small outer diameter. In addition, the twist construction of both the large and small denier cords is designed before hand by engineers in the textile industry such that the theoretical stress-strain curves of both the large and small denier cords are the same.

As a result, the theoretical and experimental fatigue characteristics of the large denier cord are not different from those of the small denier cord. The use of the large or small denier cord is suitably selected by balancing characteristics required for the tire other than the fatigue resistant property, for example, cut resistant property, burst resistant property, separation resistant property, resistance to wear, heat generating property or the like with the productivity and manufacturing cost of the tire.

In the conventional tire designed such that the strains produced in various portions of the tire are substantially the same, the reasons why the cord breaking up failure, which has not been induced so often in the small denier cord, is induced so often in the large denier cord could not be elucidated.

The present invention is started from the investigation on the reasons why the cord breaking up failure is so often induced in the large denier cord of the conventional tire.

Experimental tests and investigations on the conventional tire, which has induced the cord breaking up failure, have demonstrated the result that the cord breaking up failure is caused by compressive fatigue produced by repetitions of the compressive strain produced in the cords of the carcass when the tire runs under load.

Inventor's detailed observations on the broken surface of the cord portion where the cord breaking up failure has been induced have shown the result that judging from the state of the broken surface of the filaments of the cord, the breakage of the cord is due to the fatigue breakage of the filaments per se. But, if the established theory of the prior art techniques that the theoretical and experimental fatigue properties of the large and small denier cords are not different from each other is approved, it is difficult to understand the clear and practical difference in the fatigue property between the large and small denier cords.

The inventor has had doubt about the conventional established theory in itself by considering the inconsistent relation between the conventional established theory and the practical phenomenon. Investigations on the root of the conventional established theory have demonstrated the result that the cord in itself is resistant against tensile stress, that all of theoretical developments and experimental tests have mainly been carried out on the tensile strain (stress) of the cord, that the above mentioned established theory should strictly be applied to the tensile strain (stress) only, and that there are no grounds to rely upon the fact that the established theory is also applicable to the compressive strain (stress).

Figure 1:
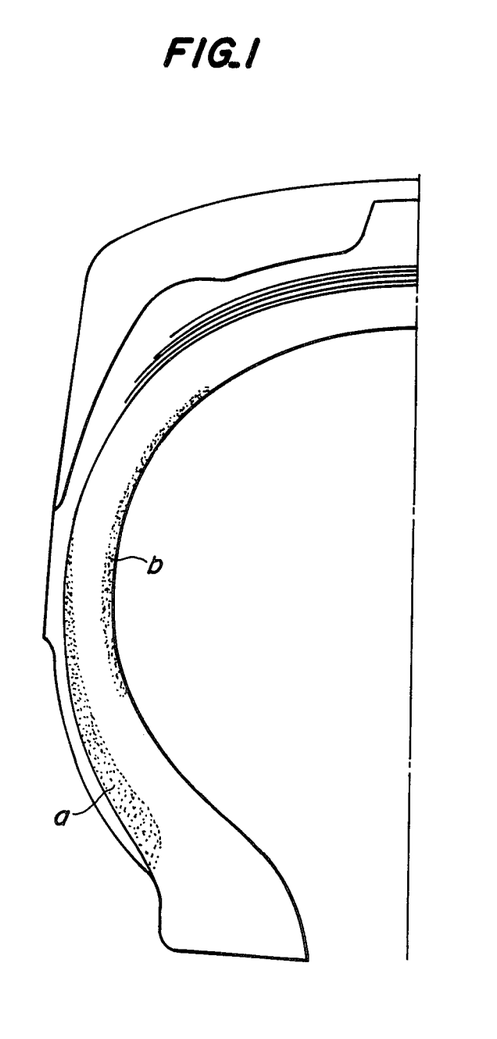
FIG. 1 is a cross-sectional view of a conventional tire showing regions where cord breaking up failures are induced.

Experimental tests have shown the result that the cord breaking up failure is concentrically induced on that portion of the tire which is subjected to tensile stress which is $\frac{1}{2}$ to $\frac{2}{3}$ times smaller than the tensile stress subjected to the crown portion when the tire is inflated by applying an internal pressure therein and which is subjected to compressive strain when the tire runs under load, that is, induced in an outer layer of the tire between the side portion and the bead portion as shown by a in FIG. 1. In addition, experimental tests have also shown the result that the cord breaking up failure is not only induced in the a portion but also induced in that portion of the tire which is subjected to the tensile stress which is ½ to ⅔ times smaller than the tensile stress subjected to the crown portion when the tire is inflated by applying an internal pressure therein and which is subjected to the compressive strain when the tire runs under inflated condition with a low internal pressure or under extremely heavy load, that is, induced, in an inner layer of the tire between the shoulder portion and the side portion as shown by b in FIG. 1.

Based on such recognition, the inventor has measured the movement, particularly strain induced in the cords in the above mentioned portions a and b when the tire runs under load.

Figure 2:
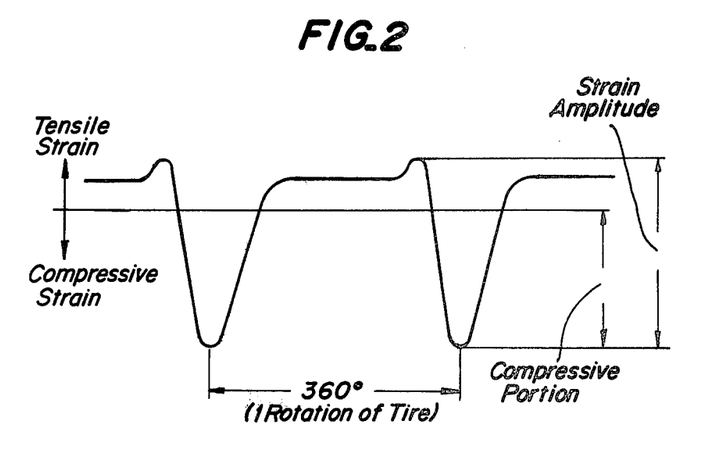
FIG. 2 is a graph illustrating strains produced in the regions where the cord breaking up failures are induced as shown in FIG. 1.

Such measurements have demonstrated the result that a considerably large compressive strain is produced in the cords at the portion a when the tire is used under usual condition and that a considerably large compressive strain is also produced in the cords at the portion b when the tire is used under inflated condition with a low internal pressure and under extremely heavy load condition. Such state of strains is shown in FIG. 2.

Experimental tests and investigations started from the investigation on the conventional established theory and movement of strain produced on the cord have shown the result that the fatigue resistant property of the cord subjected to the compressive strain (stress) becomes rapidly decreased as the total denier of the tire cord, that is, the cord diameter is increased. This phenomenon will be described with reference to a practical example.

Use was made of a hollow rubber cylinder having an outer diameter of 40 mm and an inner diameter of 20 mm and provided along its outer layer which is large in thickness with cords to be tested arranged in parallel with an axial direction of the rubber cylinder and equidistantly separated from each other. The hollow rubber cylinder was closed at both ends thereof and applied an internal pressure of air therein. The rubber cylinder was bent such that its axis was inclined at angles of 90° and then fitted to a fatigue testing machine. The rubber cylinder thus bent was supported at its both ends and rotated about its bent axis at a speed of 100 RPM, thereby giving compressive fatigue to the cords.

That is, the cords at the bent portion were subjected to the tensile strain when these cords arrive at the outside of the bent portion and subjected to the compressive strain when those cords arrive at the inside thereof.

Figure 3:
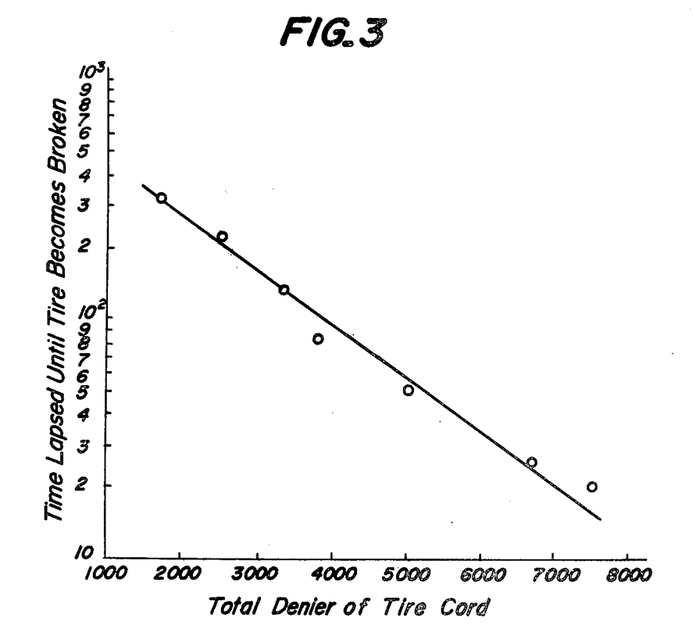
FIG. 3 is a graph showing a relation between a total denier of a tire cord and a time lapsed until the tire becomes broken due to fatigue caused by repeated rotations of the tire.

FIG. 3 shows the above mentioned experimental test result.

In FIG. 3, the time lapsed until the rubber cylinder becomes broken due to the compressive fatigue is shown on the ordinate in logarithmic scale, while the total denier of the tire cords to be tested is shown on the abscissa.

As seen from FIG. 3, as the total denier of the cord, that is, the cord diameter is increased, the compressive fatigue resistant property thereof becomes rapidly decreased.

Experimental tests have demonstrated the result that the cause of inducing the cord breaking up failure and more particularly the low compressive fatigue resistant property of the large denier cord is dependent on the number of twists per unit length of the cord, and that the compressive fatigue resistant property of the large denier cord can effectively be improved by increasing the number of twists per unit length of the cord.

In general, it has been well known that the optimum value of the number of twists is mainly determined by the relation between the strength rquired for the cord and the elongation thereof, and that the number of twists exerts influence on the fatigue resistant property of the cord. But, hitherto none has considered the influence of the number of twists exerted on the fatigue resistant property of the cord under the repeated compressive strain.

Experimental tests have shown the result that the fatigue resistant property of the cord when it is subjected to the compressive strain (stress) becomes considerably increased in response to the increase of the number of twists of the cord. This phenomenon will concretely be described with reference to a practical example.

Use was made of hollow rubber cylinders to be tested which are the same as that used in the above mentioned example and which are provided at the outer layers thereof with cords of 1,260 d/2 formed of the same filaments and having different number of twists, respectively. The compressive fatigue characteristics of these rubber cylinders were compared with each other.

Figure 4:
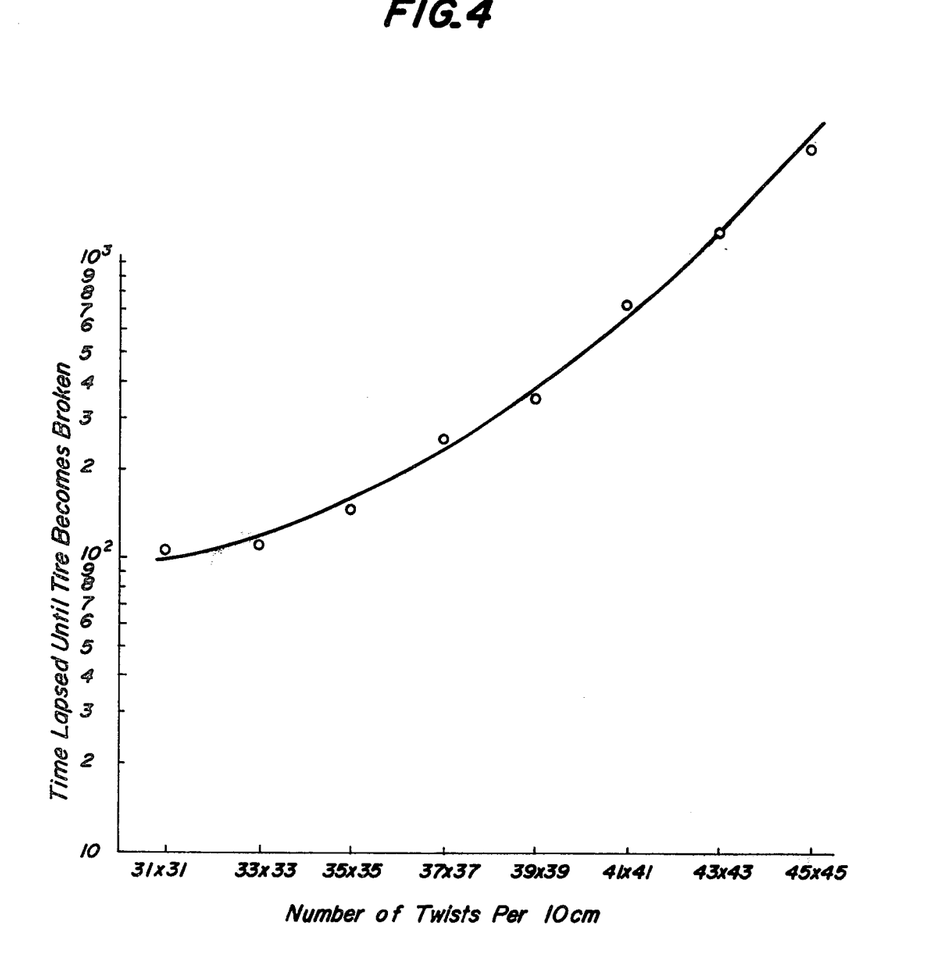
FIG. 4 is a graph showing a relation between the number of twists per 10 cm of a tire cord and a time lapsed until the tire becomes broken due to fatigue caused by repeated rotations of the tire.

FIG. 4 shows the result of such experimental tests.

In FIG. 4, the time lapsed until the rubber cylinder becomes broken due to the compressive fatigue is shown on the ordinate in logarithmic scale, while the number of twists per unit length of the cord to be tested is shown on the abscissa.

It should be noted that, if the number of twists per unit length of the filament is different from that of the cord, an average value of these different number of twists is used as the number of twists per unit length of the cord.

As seen from FIG. 4, the use of a large number of twists of the cord ensures a significant increase of the compressive fatigue resistant property of the cord if compared with the use of a small number of twists of the cord.

In the present invention, in order to attain the object thereof on the basis of the above mentioned novel recognition, many experimental tests and investigations effected on the carcass of the above mentioned kinds of tire with reference to the use thereof have demonstrated the result that the basic elucidation of the following facts and the composite harmony therebetween result in a good result.

A: Dispersion and alleviation of the strain at a region intermediate between the side portion and the bead portion, B: Suppression of the cord fatigue, and C: Balancing the strength of the cord with the elongation thereof.

In the present invention, the carcass body is composed of a plurality of plies formed of rubberized organic textile cords such as nylon cords extending in parallel with each other. The cords of about one half of the total plies are inclined with respect to the circumferential midline of the tire and extend in an opposite direction with respect to the cords of the other half, thereby providing a bias laid construction in the same manner as the prior art technique.

It is the most preferable that even number of plies are laminated such that the cords of one of adjacent two plies extend in an opposite direction with respect to the cords of the other ply. The cords of adjacent two plies may locally be the same in direction. The plies whose cords extend in opposite directions are not always the same in number.

The carcass body as described above is composed of at least two kinds of ply groups 1, 2, ..., n−1, n whose cords are the same in diameter, but different in the number of twists. The number of twists of the cords of the outermost carcass ply group is made 5% to 30% times larger than the number of twists of the cords of the ply group adjacent to the outermost carcass ply group and located at the inner portion in the carcass and is made at least equal to the number of twists of the cords of the innermost carcass ply group. The number of twists of cords of the innermost carcass ply group is made 5% to 30% times larger than the number of twists of the cords of the ply group adjacent to the innermost carcass ply group and located at the outer portion in the carcass.

That is, the first kind of ply group is composed of cords having the number of twists $N_1$, the second kind of ply group is composed of cords having the number of twists $N_2$ which is different from $N_1$ and the nth kind of ply group is composed of cords having the number of twists $N_n$ which is different from those of the previous first, second, ... the (n−1)th kinds of ply groups under a condition given by $$N_1 > N_2 \ldots > N_{(n-1)} > N_n.$$

In the above mentioned plurality of kinds of ply groups, use is made of a combination of at least two kinds of ply groups in which the ply group composed of cords having the largest number of twists relative to the other is arranged at the outermost portion of the carcass body, while the ply group composed of cords having the same or smaller number of twists relative to the outermost ply group is arranged at the innermost portion of the carcass body.

It is the most preferable that between the outermost and innermost ply groups is interposed the remaining kind of ply group composed of cords having the number of twists which is smaller than those of the outermost and innermost ply groups. In this case, the ply group which is the same in kind as the innermost ply group may be arranged as a part of the above mentioned remaining kind of ply group.

It is the simplest to construct the carcass body by two kinds of ply groups. These two kinds of ply groups are combined such that $N_2:N_1$ is 1:1.05 to 1.25, preferably 1:1.07 to 1.19.

If this ratio is smaller than 1:1.05, the significant effect of improving the cord breaking up failure resistant property could not be obtained, so that the ratio of 1:1.05 should be the lower limit. On the one hand, if the number of twists of the cord is increased, the elongation becomes increased, but the strength is decreased. As a result, if the ratio exceeds 1:1.25, the excessive increase of the number of plies required for maintaining the same carcass strength results in an increase in thickness of the carcass which necessarily increases the compressive strain produced in the carcass portion extending from the shoulder portion through the side portion to the bead portion and hence increases the compressive strain produced in the cord. As a result, even though a cord having a large number of twists is used, the effect of improving the cord breaking up failure resistant property could not be obtained. In addition, the use of the excessively large ratio between the number of twists results in difference between the tensile and compressive moduli of elasticity of the cord. As a result, an excessively large shearing strain is induced in the boundary surface between the ply groups of the cords, thereby degrading the separation resistant property of the tire. This is the reasons why the upper limit of the ratio between the numbers of twists of the two kinds of ply groups should be determined to 1:1.25.

The two kinds of ply groups having the above mentioned range of the ratio between the numbers of twists are combined such that a ratio of the number of plies of the innermost ply group whose cords have a large number of twists to the total number of plies except the number of plies of the turn-up portion of each ply at a region intermediate between the maximum width position of the tire and the bead portion is 0.06 to 0.67, preferably 0.10 to 0.50, while a ratio of the number of plies of the outermost ply groups whose cords have a large number of twists to the above mentioned total number of plies is 0.07 to 0.60, preferably 0.11 to 0.55.

If the ratio of the number of plies of the innermost ply group whose cords have the large number of twists to the above mentioned total number of plies is smaller than 0.06 or if the ratio of the number of plies of the outermost ply group whose cords have the large number of twists to the above mentioned total number of plies is smaller than 0.07, the effect of improving the cord breaking up failure resistant property is not sufficiently large, so that 0.06 and 0.07 should be made the lower limits, respectively. If the above mentioned ratio of the innermost ply group whose cords have the large number of twists exceeds 0.67 or if the above mentioned ratio of the outermost ply group whose cords have the large number of twists exceeds 0.60, the number of plies required for maintaining the same strength of the carcass becomes excessively increased so as to increase the thickness of the carcass, thereby increasing the compressive strain produced in the carcass portion extending from the shoulder portion through the side portion to the bead portion in the same manner as in the case of making the ratio of the number of twists of the cord excessively large.

As a result, the compressive strain subjected to the cord becomes increased and hence the effect of improving the cord breaking up failure resistant property with the aid of the cords having the large number of twists becomes insufficient. This is the reason why the upper limits of the above mentioned ratios of the numbers of plies of the innermost and outermost ply groups whose cords have the large number of twists should be made 0.67 and 0.60, respectively. It should be noted that the maximum width position of the tire means the maximum width position of the outermost layer of the carcass.

The three kinds of ply groups are combined such that the ratio of the numbers of twists of these cords are 1:1.05 to 1.20:1.10 to 1.30, preferably 1:1.07 to 1.16:1.15 to 1.26. The reasons why the lower and upper limits of the twisting ratios are determined to the above mentioned values are substantially the same as those described with reference to the combination of the above mentioned two kinds of ply groups.

Let these three kinds of ply groups be designated by "small". "intermediate" and "large" in accordance with the number of twists of the cords, respectively. Then, it is the most preferable to arrange these three kinds of ply groups in the order of "intermediate", "small" and "large" as viewed from the inside to the outside of the carcass. Alternatively, these three kinds of ply groups may be arranged in the order of "intermediate", "small", "intermediate" and "large"; "large", "small", "intermediate" and "large"; "large", "intermediate", "small" and "large"; "large", "intermediate", "small", "intermediate" and "large" or the like as viewed from the inside to the outside of the carcass.

In addition, the three kinds of ply groups whose cords have the twisting ratio of the above mentioned range are arranged near the region intermediate between the maximum width position of the tire and the bead portion such that a ratio of the number of plies of the innermost ply group whose cords have the intermediate or large number of twists to the total number of plies except the number of plies of the turn-up portion of each ply is 0.06 to 0.67, preferably 0.10 to 0.50 and that a ratio of the number of plies of the outermost ply group whose cords have the large number of twists to the above mentioned total number of plies is 0.07 to 0.60, preferably 0.11 to 0.55. The reasons why the lower and upper limits of the above mentioned ratios are determined to the above mentioned values are the same as those described with reference to the combination of the two kinds of ply groups.

If the number of plies is further increased, use may be made of ply groups divided into four kinds or more, that is, use may be made of cords classified into the sections twisted in accordance with these kinds.

In any case, in order to combine more than two kinds of ply groups for the purpose of obtaining the above mentioned effective cord breaking up failure resistant property, it is indispensable to combined and laminate certain number of ply groups such that the cords of the outermost layer of the carcass body have the number of twists which is 5% to 30% times larger than that of the cords adjacent to the outermost layer and located inner parts in the carcass and which is at least equal to that of the cords of the innermost layer, and that the cords of the innermost layer of the carcass body have the number of twists which is 5% to 30% times larger than that of the cords adjacent to the innermost layer and located at outer portion in the carcass.

In carrying out the invention, it is preferable to arrange the ply groups which are different in the number of twists and adjacent with each other such that the boundary surface between these ply groups is interposed between the inner plies of the ply bundle wound around the same bead core in the same direction to form the turn-up portion thereof, and that, in a carcass reinforcing type in which another ply bundle adjacent to the above mentioned ply bundle is wound around another bead core adjacent to the above mentioned bead core, the boundary surface between the ply groups is interposed between the inner plies of either one or both of the above mentioned two adjacent ply bundles.

In any embodiment of the invention, if the above mentioned conditional range is selected on the basis of the tire design added with the practical condition of use of the tire, manufacturing cost or the like, it is possible to obtain a good result. In this way, the invention is capable of decreasing the number of carcass plies and hence improving the production efficiency of the tire and reducing the manufacturing cost of the tire without inducing the cord breaking up failure and any other failures or is capable of improving the cord breaking up failure resistant property without decreasing the productivity of the tire and without reducing the resistance of the tire against any other failures.

That is, the invention is capable of not only effectively preventing occurrence of the cord breaking up failure until the useful life of the tire is completely expired, but also properly determining the value and distribution of the compressive strain subjected to the cords when the tire runs under load for the purpose of making the fatigue of the cords of all of the plies uniform.

Thus, the invention has a number of advantages. In the first place, it is possible to exhibit the cord breaking up failure resistant property which is far superior to that of the conventional tire used under heavy load. Secondary, the thickness of the carcass can be reduced if compared with that of the conventional tire in which all of the plies include cords having a large number of twists. Third, it is possible to effectively prevent the cord breaking up failure under the reduced compressive strain subjected to the carcass body region extending from the shoulder portion through the side portion to the bead portion. Fourth, the reduction in the number of plies contributes to improvement in the productivity of the tire, lowering of the manufacturing cost and prevention of generation and accumulation of heat when the tire runs under load. Finally, the adequate selection of the ratio between the numbers of twists of the cords results in the effective prevention of the excessively large increase of the shearing strain between the plies, thereby effectively preventing the separation failure of the tire.

In the present invention, the carcass body may be composed of plies formed of organic textile cords such, for example, as nylon, rayon, vinylon, polyester or the like and aromatic polyamide fiber having a high modulus of elasticity.

The invention will now be described with reference to practical examples.

EXAMPLE 1

Figure 5:
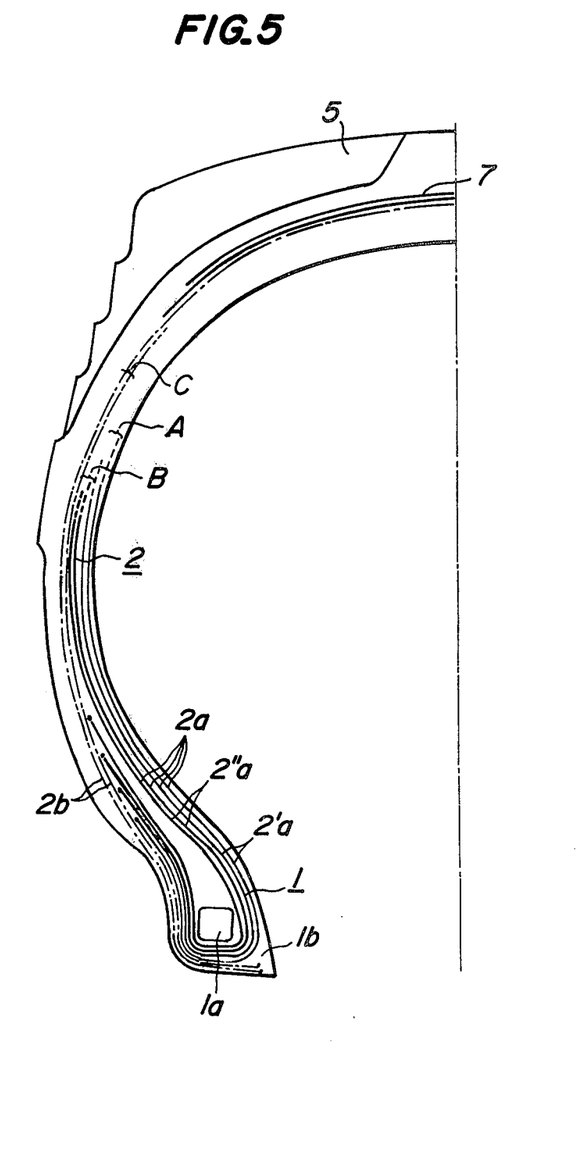
FIGS. 5, 7, 9, 10 and 11 are cross-sectional views of different embodiments of a tire according to the invention, respectively.

FIG. 5 shows a cross-section of a first embodiment of a tire according to the invention on a plane passing through the rotational axis of the tire. The tire shown in FIG. 5 is a traction tread tire for industrial vehicles and has a size of 7.00-12 12 PR.

In the present example, a bead portion 1 comprises 1 set of bead core 1a and a carcass body 2 is composed of three kinds of nylon cord ply groups A, B, C which are of 1,260 d/2 and which are the same in diameter, but different in the number of twists, the total number of plies being 6.

In all of the plies, a ply bundle 2a is composed of 4 nylon plies including two inner plies 2a' whose cords have the number of twists of 39 turns/10 cm (the number of twists of the filaments and cords are 39 turns/10 cm, respectively) and including two outer plies 2a'' whose cords have the number of twists 37 turns/10 cm (the number of twists of the filaments and cords are 37 turns/10 cm, respectively). The ply bundle 2a as a whole is wound around the bead core 1a from the inside of the tire toward the outside thereof to form a turn-up portion. A ply bundle 2b is composed of 2 nylon cord plies whose cords have the number of twists of 41 turns/10 cm (the number of twists of the filaments and cords are 41 turns/10 cm, respectively). The ply bundle 2b as a whole is bent at the bead heel portion from the outside of the tire toward the inside thereof and extends along the lower surface of the bead core 1a and is terminated at and secured to the bead toe portion 1b.

The cords of each ply extend in parallel and are inclined at about 40° with respect to the circumferential direction of the tire measured at the crown center portion of the tire. The cords of one ply extend in an opposite direction with respect to the cords of the adjacent ply and these cords of the two adjacent plies cross with each other.

About the outside of the carcass body 2 in the crown portion 5 is superimposed a breaker 7 composed of 2 nylon cord plies of 840 d/2.

In the present example, a ratio of the number of twists of the cords between the three kinds of ply groups is 1.054:1:1.108 in the order as viewed from the inside of the carcass and a ratio of the number of plies of the innermost ply group whose cords have the intermediate number of twists to the total number of plies except the number of plies of the turn-up portion located at the region intermediate between the maximum width position and the bead portion is 0.33 and a ratio of the number of plies of the outermost ply group whose cords have the large number of twists to the above mentioned total number of plies is also 0.33.

In order to compare the ability of the above mentioned tire according to the invention with that of a conventional tire, provision was made of a conventional tire comprising a carcass body composed of one kind of nylon cord plies whose cords are the same as those of 2 inside plies $2a'$ of the ply bundle $2a$, that is, 1.260 d/2 and have the number of twists of 39 turns/10 cm (the numbers of twists of the filaments and cords are 39 turns/10 cm, respectively). The overall strength of the carcass and any other constructions of the conventional tire were made equal to those of the tire according to the invention as defined by the above example 1.

Figure 6:
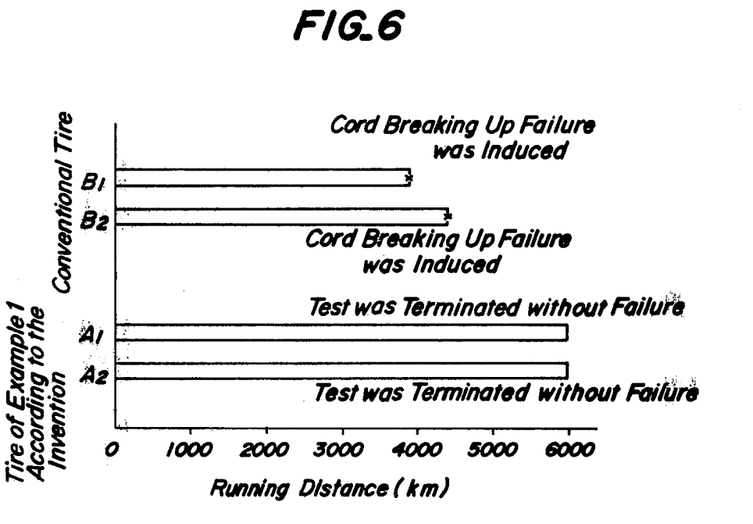
FIGS. 6 and 8 are graphs illustrating cord breaking up failure resistant property of tires according to the invention as compared with that of conventional tires.

Experimental tests on the cord breaking up failure resistant property of both the conventional tire and the tire according to the invention have demonstrated the result shown in FIG. 6. In FIG. 6, the kind of the tires to be tested is shown on the ordinates, while the running distance of the tires to be tested is shown on the abscissa. This test was an acceleration test with the aid of an indoor drum testing machine. The tests were effected under the same following conditions. The tires were mounted on regular rims of 5.00 S×12 DT and inflated by an internal pressure of 7.0 kg/cm². The tires run at a speed of 24 km/h under a load of 2,190 kg. In FIG. 6, $A_1$, $A_2$ designate the tires according to the invention as described in the example 1 and $B_1$, $B_2$ designate the above mentioned conventional tires.

As seen from FIG. 6, the conventional tires $B_1$ and $B_2$ induced the cord breaking up failure at the running distance of 3,900 km and 4,400 km, respectively, while the tires $A_1$ and $A_2$ according to the invention could run 6,000 km without inducing any failure, the test being terminated at the end of the running distance of 6,000 km.

EXAMPLE 2

Figure 7:
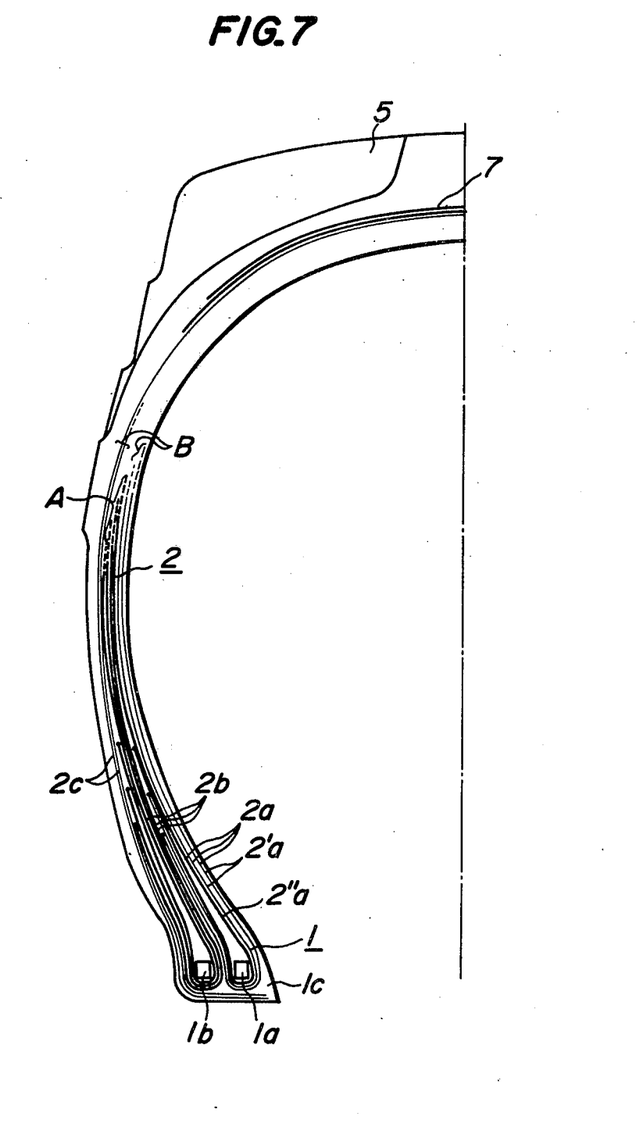

FIG. 7 shows a cross-section of a second embodiment of a tire according to the invention on a plane passing through the rotational axis of the tire. The tire shown in FIG. 7 is a heavy tread tire for automobiles and has a size of 10.00-20 14 PR.

In the present example, a bead portion 1 comprises two sets of bead cores $1a$, $1b$ and a carcass body 2 is composed of two kinds of nylon cord ply groups A, B whose cords are 1,890 d/2 and the same in diameter, but different in the number of twists, the total number of plies being 8.

In the total plies, a ply bundle $2a$ is composed of 3 nylon cord plies, 2 inner plies $2a'$ of which having the number of twists of 35 turns/10 cm (the numbers of twists of the cords of the filaments and cords are 35 turns/10 cm, respectively) and 1 outer ply $2a''$ of which having the number of twists of the cords 30 turns/10 cm (the numbers of twists of the filaments and cords are 30 turns/10 cm, respectively). The ply bundle $2a$ as a whole is wound around the bead core $1a$ from the inside of the tire toward the outside thereof to form a turn-up portion. A ply bundle $2b$ is composed of 3 nylon cord plies whose cords have the numbers of twists of 30 turns/10 cm (the number of twists of the filaments and cords are 30 turns/10 cm, respectively) and wound around the bead core $1b$ from the inside of the tire toward the outside thereof to form a turn-up portion. An outer ply bundle $2c$ is composed of 2 nylon cord plies whose cords have the number of twists of 35 turns/10 cm (the number of twists of the filaments and cords are 35 turns/10 cm, respectively). The outer ply bundle $2c$ as a whole is bent at the bead heel portion from the outside of the tire toward the inside thereof and extends along the lower surfaces of the bead cores $1b$, $1a$ and is terminated at and secured to the bead toe portion $1c$.

The cords of each ply extend in parallel and are inclined at the tire crown center portion at about 40° with respect to the circumferential direction of the tire. These cords of each ply extend in an opposite direction with respect to the cords of the adjacent ply and cross with the latter cords.

About an outside of the carcass body 2 in a crown portion 5 is superimposed a breaker 7 composed of 2 nylon cord plies of 840 d/2.

In the present example, the two kinds of ply groups A, B have a ratio of the number of twists therebetween of 1:1.167. A ratio of the number of plies of the innermost ply group having a large number of twists to the total number of plies at the region intermediate between the maximum width position of the tire and the bead portion except the number of plies of the turn-up portion is 0.25, while a ratio of the number of plies of the outermost ply group having a large number of twists to the above mentioned total number of plies is also 0.25.

Figure 8:
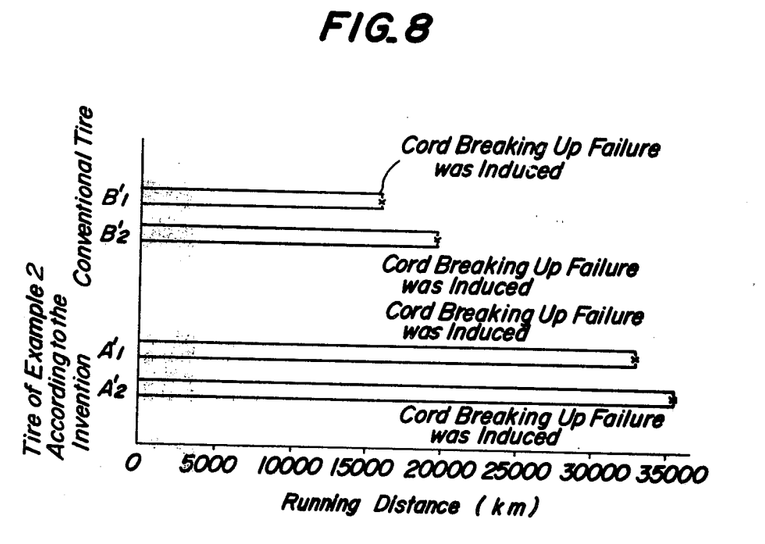

FIG. 8 shows the effect of improving the cord breaking up failure resistant property of the tire according to the invention as described with reference to the present Example 2 and obtained by the result of accelerating tests with the aid of an indoor drum testing machine which is the same as that of the example 1. In FIG. 8, the kind of the tires to be tested is shown on the ordinate, while the running distance of the tires to be tested is shown on the abscissa.

The tests were effected under the following conditions. The tires were mounted on regular rim of 7.50 V×20 IR. The tires were inflated by applying an internal pressure of 4.0 kg/cm² therein. The tires run at a speed of 60 km/h under a load of 2,770 kg. About 15 mm of the tread rubber at the crown portion of the tires to be tested was scraped off so as to reduce the tread thickness for the purpose of adjusting the internal temperature of the tires.

In FIG. 8, $A_1'$ and $A_2'$ designate the tires according to the invention described with reference to the present example 2, while $B_1'$ and $B_2'$ designate conventional tires all plies of which are composed of nylon cords of 1,890 d/2 and having the number of twists of 32 turns/10 cm (the numbers of twists of the filaments and cords are 32 turns/10 cm, respectively), the other constructions and overall strength of the carcass being the same as those of the tire according to the invention described with reference to the present example 2.

As seen from FIG. 8, the conventional tires $B_1'$ and $B_2'$ induced the cord breaking up failure at the end of the running distance of 16,800 km and 19,200 km, respectively, while the tires $A_1'$ and $A_2'$ according to the invention and described in the present example 2 induced the cord breaking up failure at only just the end of the running distance of 32,900 km and 35,500 km, respectively, thereby exhibiting the cord breaking up failure resistant property which is about 1.9 times superior to that of the conventional tire.

EXAMPLE 3

Figure 9:
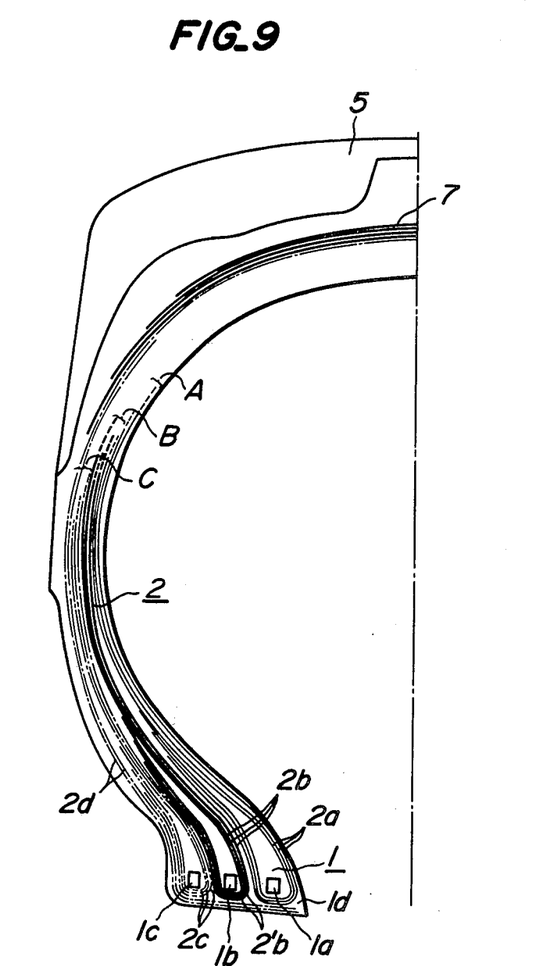

FIG. 9 shows a cross-section of a third embodiment of a tire according to the invention on a plane passing through the rotational axis of the tire. The tire shown in FIG. 9 has a size of 24.00-49 42 PR. In the present example, a bead portion 1 comprises 3 sets of bead cores 1a, 1b, 1c and a carcass body 2 is composed of three kinds of nylon cord ply groups A, B, C whose cords are the same in diameter, but different in the number of twists, the total number of plies being 22. In FIG. 9, 2 plies are represented by 1 line.

In the total plies, a ply bundle 2a is composed of 6 nylon cord plies whose cords have the number of twists of 32 turns/10 cm (the numbers of twists of the filaments and cords are 32 turns/10 cm, respectively). The ply bundle 2a as a whole is wound around the bead core 1a from the inside of the tire toward the outside thereof to form a turn-up portion. A ply bundle 2b is composed of 6 nylon cord plies whose cords have the number of twists of 29 turns/10 cm (the numbers of twists of the filaments and cords are 29 turns/10 cm, respectively). The ply bundle 2b as a whole is wound around the bead core 1b from the inside of the tire toward the outside thereof to form a turn-up portion. A ply bundle 2c is composed of 6 nylon cord plies whose cords have the number of twists of 35 turns/10 cm (the number of twists of the filaments and cords are 35 turns/10 cm, respectively). The ply bundle 2c as a whole is wound around the bead core 1c from the inside of the tire toward the outside thereof to form a turn-up portion. An outer ply bundle 2d is composed of 4 nylon cord plies whose cords have the number of twists of 35 turns/10 cm (the numbers of twists of the filaments and cords are 35 turns/10 cm, respectively). The outer ply bundle 2d as a whole is bent at the bead heel portion from the outside of the tire toward the inside thereof and extend along the lower surface of the bead cores 1c, 1b, 1a and is terminated at and secured to the bead toe portion 1d.

The cords of each ply are parallel with each other and inclined at about 35° as measured at the tire crown center portion with respect to the circumferential direction of the tire, the cords of one ply extending in an opposite direction with respect to the cords of the adjacent ply and crossing with the latter.

About the outside of the carcass body 2 in a crown portion 5 is superimposed a breaker 7 composed of 4 nylon cord plies whose cords are 840 d/2.

In the present example, the three kinds of ply groups have the ratio of the number of twists of the cords of 1.103:1:1.207 in the order as counted from the inside of the carcass. A ratio of the number of plies of the innermost ply group whose cords have the intermediate number of twists to the total number of plies at the region intermediate between the maximum width position and the bead portion except the number of plies of the turn-up portion is 0.27 and a ratio of the number of plies of the outermost ply group whose cords have the large number of twists to the above mentioned total number of plies is 0.45.

EXAMPLE 4

Figure 10:
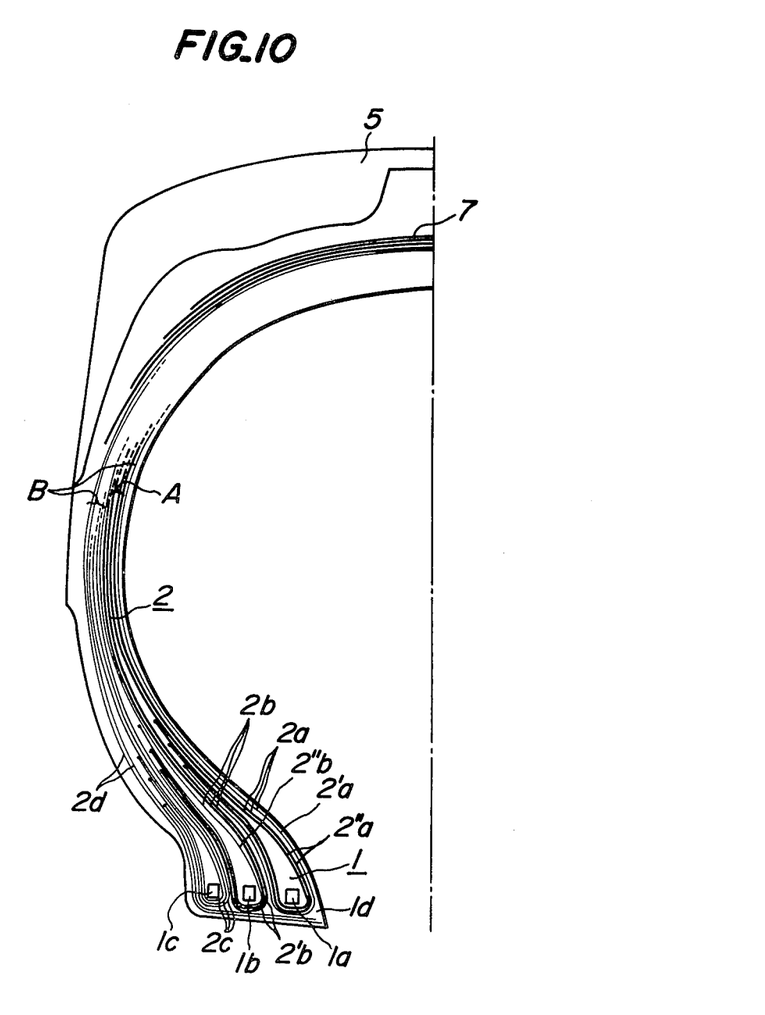

FIG. 10 shows a cross-section of a fourth embodiment of a tire according to the invention on a plane passing through the rotational axis of the tire. The tire shown in FIG. 10 has a size of 24.00-49 42PR.

In the present example, a bead portion 1 comprises 3 sets of bead cores 1a, 1b, 1c. A carcass body 2 is composed of two kinds of nylon cord ply groups A, B whose cords are of 1,890 d/2 and the same in diameter, the total number of plies being 22. In FIG. 10, 2 plies are represented by 1 line.

In the total plies, a ply bundle 2a is composed of 6 nylon cord plies. The cords of 2 inner cord plies 2a' have the number of twists of 35 turns/10 cm (the numbers of twists of the filaments and cords are 35 turns/10 cm, respectively), while the cords of 4 outer cord plies 2a" have the number of twists of 29 turns/10 cm (the numbers of twists of the filaments and cords are 29 turns/10 cm, respectively). The ply bundle 2a as a whole is wound around the bead core 1a from the inside of the tire toward the outside thereof to form a turn-up portion. A ply bundle 2b is composed of 6 nylon cord plies. The cords of 4 inner cord plies 2b' have the number of twists of 29 turns/10 cm (the numbers of twists of the filaments and cords are 29 turns/10 cm, respectively). The cords of 2 outer plies 2b" have the number of twists of 35 turns/10 cm (the numbers of twists of the filaments and cords are 35 turns/10 cm, respectively). The ply bundle 2b as a whole is wound around the bead core 1b from the inside of the tire toward the outside thereof to form a turn-up portion. A ply bundle 2c is composed of 6 nylon cord plies whose cords have the number of twists of 35 turns/10 cm (the numbers of twists of the filaments and cords are 35 turns/10 cm, respectively). The ply bundle 2c as a whole is wound around the bead core 1c from the inside of the tire toward the outside thereof to form a turn-up portion. An outer cord ply 2d is composed of 4 nylon cord plies whose cords have the number of twists of 35 turns/10 cm (the numbers of twists of the filaments and cords are 35 turns/10 cm, respectively). The outer cord ply 2d as a whole is bent at the bead heel portion from the outside of the tire toward the inside thereof and extends along the lower surface of the bead cores 1c, 1b, 1a and is terminated at and secured to the bead toe portion 1d.

The cords of each ply are inclined at about 35° at the tire crown center portion with respect to the circumferential direction of the tire, the cords of one ply extending in an opposite direction with respect to the cords of the adjacent ply and crossed therewith.

About the carcass body 2 in the crown portion 5 is superimposed a breaker 7 composed of 4 nylon cord plies whose cords are of 840 d/2.

In the present example, a ratio between the numbers of twists of the cords of the two kinds of cord ply groups A, B is 1:1.207. A ratio of the number of plies of the innermost cord ply group whose cords have the large number of twists to the total number of plies except the number of plies of the turn-up portion at the region intermediate between the maximum width position of the tire and the bead portion thereof is 0.09, while a ratio of the number of plies of the outermost cord ply group whose cords have the large number of twists to the above mentioned total number of plies is 0.55.

EXAMPLE 5

Figure 11:
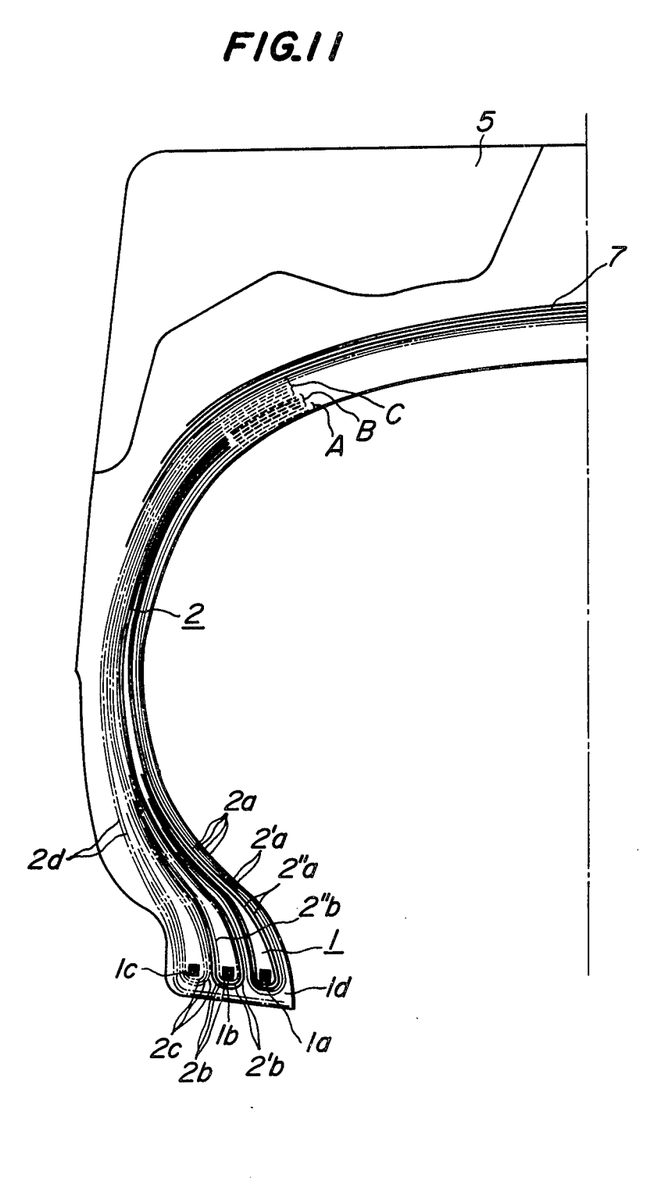

FIG. 11 shows a cross-section of a fifth embodiment of a tire according to the invention on a plane passing through the rotational axis of the tire. The tire shown in FIG. 11 has a size of 37.25-35 36 PR.

In the present example, a bead portion 1 comprises 3 sets of bead cores 1a, 1b, 1c. A carcass body 2 is composed of three kinds of nylon cord ply groups A, B, C whose cords are of 1,260 d/2 and the same in diameter, but different in the number of twists, the total number of plies being 24. In FIG. 11, 2 plies are represented by 1 line.

In all plies, a ply bundle 2a is composed of 8 nylon cord plies in which the cords of 4 inner cord plies 2a' have the number of twists of 39 turns/10 cm (the numbers of twists of the filaments and cords are 39 turns/10 cm, respectively), while the cords of 4 outer cord plies 2a" have the number of twists of 37 turns/10 cm (the numbers of twists of the filaments and cords are 37 turns/10 cm, respectively). The ply bundle 2a as a whole is wound around the bead core 1a from the inside of the tire toward the outside thereof.

A ply bundle 2b is composed of 6 nylon cord plies in which the cords of 4 inner cord plies 2b' have the number of twists of 37 turns/10 cm (the number of twists of the filaments and cords are 37 turns/10 cm, respectively), while the cords of 2 outer cord plies 2b" have the number of twists of 41 turns/10 cm (the numbers of twists of the filaments and cords are 41 turns/10 cm, respectively). The ply bundle 2b as a whole is wound around the bead core 1b from the inside of the tire toward the outside thereof to form a turn-up portion.

A ply bundle 2c is composed of 6 nylon cord plies whose cords have the number of twists of 41 turns/10 cm (the numbers of twists of the filaments and cords are 41 turns/10 cm, respectively). The ply bundle 2c as a whole is wound around the bead core 1c from the inside of the tire toward the outside thereof.

An outer ply bundle 2d is composed of 4 nylon cord plies whose cords have the number of twists of 41 turns/10 cm (the numbers of twists of the filaments and cords are 41 turns/10 cm, respectively). The outer ply bundle 2d as a whole is bent at the bead heel portion from the outside of the tire toward the inside thereof and extends along the lower surface of the bead cores 1c, 1b, 1a and is terminated at and secured to the bead toe portion 1d.

The cords of each ply are inclined at about 35° at the tire crown center portion with respect to the circumferential direction of the tire and extend in an opposite direction with respect to the cords of the adjacent ply and are crossed with the latter.

About the carcass body 2 in the crown portion 5 is superimposed a breaker 7 composed of 4 nylon cord plies whose cords are of 840 d/2. In the present example, the ratio of the number of twists between the three kinds of ply groups A, B, C is 1.054:1:1.108 in the order counted from the inside of the carcass. A ratio of the number of plies of the innermost cord ply group having the intermediate number of twists of the cords to the total number of plies except the number of plies of the turn-up portion at the region intermediate between the maximum width position of the tire and the bead portion is 0.17, while a ratio of the number of plies of the outermost cord ply group having the large number of twists of the cords to the above mentioned total number of plies is 0.50.

All of the tires according to the invention and described with reference to FIGS. 9 to 11 can exhibit the effect of improving the compressive fatigue resistant property of the cords in substantially the same manner as in the case of the tires according to the invention and described with reference to FIGS. 5 and 7. Particularly, the tires according to the invention and described with reference to FIGS. 10 and 11, in which the boundary surface between the cord ply groups whose cords are different in the numbers of twists is interposed between the inner plies of the ply bundle wound around the same bead core, can exhibit a further good effect of improving the compressive fatigue resistant property of the cords.

What is claimed is:

1. In a highly durable pneumatic tire comprising a carcass body formed by a number of laminated bias laid plies each including rubberized organic textile cords, the cords of about one half of the plies extending in an opposite direction with respect to the cords of the remaining plies and the total plies being laminated one upon the other, the improvement comprising a carcass body composed of at least two kinds of ply groups whose cords are the same in diameter, but different in the number of twists per unit length, the cords of the outermost ply group of the carcass having the number of twists which is 5% to 30% times larger than the number of twists of the ply group adjacent to the outermost ply group and located at the inner portion in the carcass and which is at least equal to the number of twists of the cords of the innermost ply group, and the cords of the innermost ply group of the carcass having the number of twists which is 5% to 30% times larger than the number of twists of the ply group adjacent to the innermost ply group and located at the outer portion in the carcass.

2. The highly durable pneumatic tire according to claim 1, wherein a carcass body is composed of two kinds of ply groups whose cords are the same in diameter, but different in the number of twists, the number of twists of the cords of the outermost ply group of the carcass being the same as that of the cords of the innermost ply group and a ratio between the numbers of twists of the cords of two kinds of ply groups being 1:1.05 to 1.25.

3. The highly durable pneumatic tire according to claim 2, wherein a ratio of the number of plies of the innermost ply group to the total number of plies except the number of plies of the turn-up portion of each ply at the region intermediate between the maximum width position of the tire and the bead portion is 0.06 to 0.67 and a ratio of the number of plies of the outermost ply group to the above mentioned total number of plies is 0.07 to 0.60.

4. The highly durable pneumatic tire according to claim 1, wherein a carcass body is composed of three kinds of cord ply groups whose cords are the same in diameter, but different in the number of twists, the outermost carcass ply group having the number of twists which is larger than that of the innermost carcass ply group and a ratio of the numbers of twists between the cords of the three kinds of cord ply groups being 1.05 to 1.20:1:1.10 to 1.30 as viewed from the insie of the carcass.

5. The highly durable pneumatic tire according to claim 4, wherein a ratio of the number of the innermost cord ply group to the total number of plies except the number of plies of the turn-up portion of each ply at the region intermediate between the maximum width position of the tire and the bead portion is 0.06 to 0.67 and a ratio of the number of plies of the outermost cord ply group to the above mentioned total number of plies is 0.07 to 0.60.

6. The pneumatic tire according to claim 1, wherein the boundary surface between adjacent cord ply groups which are different in the number of twists is interposed between inner plies of a ply bundle wound around the same bead core in the same direction or is interposed between inner plies of the above mentioned ply bundle and/or between inner plies of a ply bundle wound around a bead core adjacent to the above mentioned bead core in the same direction.

* * * * *